United States Patent
Gatto et al.

(10) Patent No.: US 9,147,315 B2
(45) Date of Patent: *Sep. 29, 2015

(54) SECURE GAME DOWNLOAD

(71) Applicant: IGT, Reno, NV (US)

(72) Inventors: Jean-Marie Gatto, London (GB); Thierry Brunet De Courssou, Palo Alto, CA (US); Pierre-Jean Beney, London (GB)

(73) Assignee: IGT, Reno, NV (US)

( * ) Notice: Subject to any disclaimer, the term of this patent is extended or adjusted under 35 U.S.C. 154(b) by 175 days.

This patent is subject to a terminal disclaimer.

(21) Appl. No.: 13/851,279

(22) Filed: Mar. 27, 2013

(65) Prior Publication Data

US 2013/0210519 A1    Aug. 15, 2013

Related U.S. Application Data

(62) Division of application No. 10/520,831, filed as application No. PCT/US02/29927 on Sep. 19, 2002, now Pat. No. 8,484,696.

(60) Provisional application No. 60/393,892, filed on Jul. 5, 2002.

(51) Int. Cl.

| A63F 13/73 | (2014.01) |
| G07F 17/32 | (2006.01) |
| A63F 13/70 | (2014.01) |
| A63F 13/30 | (2014.01) |
| G06F 21/51 | (2013.01) |
| G06F 21/57 | (2013.01) |
| H04L 29/06 | (2006.01) |
| H04L 9/32 | (2006.01) |

(52) U.S. Cl.
CPC ............ *G07F 17/3241* (2013.01); *A63F 13/12* (2013.01); *A63F 13/70* (2014.09); *A63F 13/73* (2014.09); *G06F 21/51* (2013.01); *G06F 21/57* (2013.01); *G07F 17/32* (2013.01); *G07F 17/323* (2013.01); *H04L 63/12* (2013.01); *A63F 2300/401* (2013.01); *A63F 2300/532* (2013.01); *A63F 2300/552* (2013.01); *G06F 2221/2101* (2013.01); *G06F 2221/2103* (2013.01); *G06F 2221/2109* (2013.01); *G06F 2221/2153* (2013.01); *H04L 9/3263* (2013.01)

(58) Field of Classification Search
CPC ..... G07F 17/3241; G06F 21/50; G06F 21/51; G06F 21/6218; G06F 21/00; G06F 2221/21; G06F 2221/2103; G06F 2221/2109; A63F 2300/401; A63F 2300/532; A63F 2300/535; A63F 13/70; A63F 13/73; H04L 9/32; H04L 9/3263; H04L 63/12; H04L 9/3202; H04L 9/321; H04L 9/3271
See application file for complete search history.

(56) References Cited

U.S. PATENT DOCUMENTS

2005/0229179 A1* 10/2005 Ballantyne .................... 718/100

OTHER PUBLICATIONS

Bennet Yee, May 1994, "Using Secure Coprocessors".*
"Chapter 6. Drivers, Microsoft Windows 2000 Security Handbook" by Jeff Schmidt, Aug. 7, 2000.*

* cited by examiner

*Primary Examiner* — Damon Pierce
(74) *Attorney, Agent, or Firm* — Griffiths & Seaton PLLC

(57) ABSTRACT

A method for gaming terminals, gaming kiosks and lottery terminals to ensure that the code-signing verification process of downloaded game software can be trusted. Drivers independently developed from the operating system supplier are embedded within the operating system kernel to verify that the micro-coded hardware components, the BIOS (808), the operating system components and the downloaded game software can be trusted.

10 Claims, 13 Drawing Sheets

SECURE GAME DOWNLOAD

CROSS REFERENCE TO RELATED APPLICATIONS

This application is a Divisional application of U.S. application Ser. No. 10/520,831, filed on 12 Aug. 2005, which is a application is a National Stage Application of PCT/US2002/029927, filed on 19 Sep. 2002, which claims benefit of U.S. application Ser. No. 60/393,892, filed on 5 Jul. 2002, and which applications are incorporated herein by reference. A claim of priority to all, to the extent appropriate, is made.

FIELD OF THE INVENTION

This invention relates generally to the field of casino gaming terminals, gaming kiosks and lottery gaming terminals.

DESCRIPTION OF THE RELATED ART

On-line download of updated software and new games has been performed routinely with lottery terminals since the on-line capture of lottery slips started to be deployed in the late 1980s. The techniques and procedures have been refined along the years and are now considered as essential features. On the other hand, casino regulators have always been reluctant to introduce on-line download of updated software and of new games for casino gaming machines. Such reluctance stems from concerns relative to unauthorized intrusion and malicious modification of software code. These concerns are understandable, particularly since the late 1990s because of the general trend of constructing gaming terminals using standard PC hardware and PC software platforms that are subject to assault by hackers that are well versed in the techniques for taking advantage of the known weaknesses and flaws of such platforms. Even now with lotteries, the appeal of making use of the broadband public Internet network instead of private networking is considerable, but there are indeed significant security concerns and consequently new plans are blurred with uncertainty.

Although specialized download utilities and software update utilities such as Windows Installer, InstallShield and GetRight include data integrity verification mechanisms to ensure that the downloaded code is not corrupted, there is no mechanism to ensure that the code has not been tampered with. While secure Internet software download technologies such as Authenticode employ powerful PKI (Public Key Infrastructure) code signing, there is no fail-proof mechanism to ensure that the code has not been tampered with at a later stage. Once an authorized properly signed software module has started execution, the operating system does not provide means to verify if the code loaded in memory has not been tampered with to execute fraudulent operations.

Although software corporations like Microsoft have lately shifted their development focus to making their software more stable and very secure, there is always the risk that an unknown bug or a back door exists somewhere amongst the millions lines of code that would allow someone to perpetrate some form of cheat. Hidden back-doors might be mandated by the United States' NSA (National Security Agency) to be incorporated in operating systems to enable them to monitor terrorism and drug trafficking. Consequently, some corrupt employees or ex-employees having inner knowledge of these back door accesses might be tempted to fraudulently exploit such inner knowledge. Microsoft operating systems and other modern operating systems such as Linux are too complex and constantly changing to consider comprehensive certification by labs traditionally trusted by game regulators for certifying gaming products made by gaming equipment vendors.

Moreover, using strong PKI code signing techniques does not guaranty that the code can be trusted once verified because the "verifying" tool, or the tool that verifies the verifying tool (and so on . . . ) may itself not be trusted.

The approach of the Trusted Computing Platform Alliance (TCPA), whose specification was finalized in January 2001, calls for the creation of a Trusted Platform Module (TPM) that requires a discrete cryptographic processor residing on the PC's motherboard that contains a unique digital signature. Microsoft's security initiative code named "Palladium", on the other hand, uses new forthcoming hardware security features built directly into microprocessors and supporting chipsets being designed by Intel, AMD and National in order to run some form of low-level encryption, and it can also use a TPM-like module for additional encryption. Microprocessors and supporting chipsets that implement Palladium may support a trusted execution mode that allows cryptographically authenticated programs access to a separate memory area. Such microprocessors may be equipped with a security coprocessor, which stores a unique pair of cryptographic keys in a non-volatile memory. Such a microprocessor and coprocessor may then be combined to create a motherboard that implements Palladium functionality. A corresponding software component, called the Trusted Operating Root, works in conjunction with the microprocessor and its coprocessor. The Trusted Operating Root running on the microprocessor and the coprocessor are configured to encrypt data in such a way that no other combination of Trusted Operating Root and coprocessor would be able to decrypt it.

The above security technologies are indeed promising but they require specific hardware that may take several years to be proven and to justify using them in gaming terminals. Furthermore, there may always persist a lingering distrust of such large corporate software providers such as, for example, Microsoft. Consequently, game regulators tend to hold back the deployment of such technologies, thereby discouraging the early adoption of networked multimedia software technologies as applied to the heavily regulated gaming industry.

SUMMARY OF THE INVENTION

There is no better alternative for casinos and lotteries gaming computer hardware but to adopt standard PC hardware controlled by the latest generation multimedia software from Microsoft, QNX, WindRiver Systems, Unix or from the Linux community. It is, therefore, an object of this invention to provide additional security mechanisms that can perform independent and trusted verification of the Commercial-Off-The-Shelf (COTS) software installed on the gaming terminals that can be trusted because of its precisely defined objectives and the availability of source code for peer review and certification by gaming certification labs.

Gaming terminals, gaming kiosks and lottery terminals are hereafter collectively referenced as gaming machines, for ease of reference.

The most promising approach available today in a COTS multimedia product that offers comprehensive security for preventing unauthorized code from executing, is integrated in Microsoft Windows XP, Windows 2000 and Windows NET. There are three technologies that address three different layers; namely, (1) Driver Signing, (2) Windows File Protection and (3) Software Restriction Policies. These three technologies cover all but two aspects of possible execution by unauthorized modified software code, that is, (1) by modification of the motherboard BIOS or other add-on boards such as a graphic card with on-board BIOS or a SCSI controller with dedicated on-board BIOS, (2) by modification of an emulated CPU such as downloadable microcode for the Transmeta microprocessor that emulates Intel CPU instructions. The risk with the emulated CPU instructions can be simply avoided by not allowing the use of such emulating microprocessors. It is, therefore, another object of this invention to provide a trusted mechanism to verify that the motherboard BIOS and add-on BIOS are not unauthorized. It is a further object of this invention to provide a trusted mechanism to verify memory content, hardware register content and any form of data storage media. Verification, according to embodiments of the present invention, relies on a hash signature or on code signing with a trusted certificate.

It is to be noted that the present invention covers the prevention of execution of unauthorized software but not the authentication of users and processes that are handled by the standard Access Control List (ACL) of the operating system.

According to one embodiment thereof, the present invention is a method for a gaming terminal to authorize execution of downloaded software, comprising the steps of running in the gaming machine a version of Microsoft Windows operating system having Software Restriction Policy capability, and setting the Software Restriction Policy to authorize execution of software code-signed with a certificate from a designated trusted party.

The running step may run a version of Microsoft Windows operating system having System File Protection capability. The running step may run a version of Microsoft Windows operating system having Driver Signing capability. The method may further include the step of setting the Microsoft Driver Signing policy to only authorize execution of drivers code-signed with a certificate from Microsoft. A step of setting the Microsoft Driver Signing policy to only authorize execution of drivers that are code-signed with a certificate from at least one of Microsoft and a designated trusted party may also be carried out. The running step may run a version of Microsoft Windows operating system having System File Protection and Driver Signing capabilities. The gaming machine may include a microprocessor and the microprocessor and the operating system in the running step may collectively implement Microsoft's Palladium (or an equivalent) functionality. The operating system in the running step may be a Microsoft Windows operating system that, together with the microprocessor, implements Microsoft's Palladium, Windows File Protection and Driver Signing capabilities or like functionalities. The gaming machine may include a motherboard and the operating system in the running step may be a version of Microsoft Windows operating system that, together with the motherboard, implements capabilities specified by the Trusted Computing Platform Alliance (TCPA) or similar functionalities. The gaming machine may include a microprocessor and the operating system in the running step may be a version of Microsoft Windows operating system that, together with the microprocessor, implements TCPA, System File Protection or Windows File Protection and Driver Signing.

According to another embodiment thereof, the present invention is also a method for a gaming terminal to authorize execution of downloaded software, comprising the steps of: running an operating system that may include a configurable functionality for restricting code execution to code that has been signed by a designated trusted party, and configuring the restricting functionality to only authorize execution of software that is code-signed with a certificate from the designated trusted party.

The restricting functionality may conform to the Microsoft Software Restriction Policy, for example. The operating system in the running step may be configured to prevent a replacement of selected monitored or protected system files with files that do not originate from a trusted source. The trusted source may be the same as the designated trusted party. The operating system may include Microsoft's System File Protection (SFP) or Microsoft's Windows File Protection (WFP), for example. The operating system in the running step may be configured to only allow execution of drivers that have been code-signed with a certificate from a trusted source. The operating system may include Microsoft's Driver Signing and the trusted source may be Microsoft. The operating system in the running step may be configured to prevent a replacement of selected monitored or protected system files with files that do not originate from a trusted source, and only allow execution of drivers that have been code-signed with a certificate from the trusted source, such as, for example, Microsoft. The operating system in the running step may incorporate Microsoft's Driver Signing and for example. The gaming machine may include a microprocessor and supporting chipsets that, together with the operating system in the running step, implements a Palladium-like capability. The machine may include a microprocessor and supporting chipsets that, together with the operating system in the running step, implements a. Palladium-like, System File Protection and Driver Signing capabilities. The gaming machine may include a motherboard that, together with the operating system in the running step, implements capabilities specified by the Trusted Computing Platform Alliance (TCPA). The gaming machine may include a microprocessor that, together with the operating system in the running step, implements TCPA, and Microsoft's Windows File Protection and Driver Signing.

According to still another embodiment thereof, the present invention may also be viewed as a method for operating a gaming machine, comprising the steps of running an operating system loaded in the gaming machine; downloading at least one software module into the gaming machine; checking a code signature of at least one downloaded software module using a trusted verification driver, and authorizing execution of the downloaded software module in the gaming machine only if the downloaded software module may be successfully verified by the trusted verification driver.

The running step may run an operating system that is configured to prevent the replacement of selected monitored or protected system files within the gaming machine with files that do not originate from a trusted source. The running step may run an operating system that may include Microsoft's System File Protection (SFP) or Microsoft's Windows File Protection (WFP). The operating system in the running step may causes the authorizing step to authorize execution of the downloaded software module only if the downloaded software module has been code-signed with a certificate from a trusted source. The timing step may run an operating system that may include Microsoft's Driver Signing and the trusted source may be Microsoft. The downloaded software module may include a driver and the method further may include the step of setting a Microsoft Driver Signing policy to cause the authorizing step to only authorize execution of drivers that are code-signed with a certificate from Microsoft. The method may further include the step of setting a Microsoft Driver Signing policy to cause the authorizing step to only authorize execution of drivers that are code-signed with a certificate from Microsoft and/or a designated trusted source. The operating system in the running step may be a Microsoft Windows operating system that includes System File Protection and/or Driver Signing capabilities. The gaming machine may include a microprocessor that, together with the operating system in the running step, implements Microsoft's Palladium capability or similar capabilities from other vendors. The gaming machine may include a microprocessor that, together with the operating system in the running step, implements Microsoft's Palladium, Windows File Protection and/or Driver Signing capabilities, for example. The gaming machine may include a motherboard that, together with the operating system in the running step, implements capabilities specified by the Trusted Computing Platform Alliance (TCPA). The operating system in the running step may be a Microsoft operating system, for example. The operating system in the running step may be a Microsoft operating system implementing TCPA, System File Protection or Windows File Protection and/or Driver Signing, for example. The operating system in the running step may include the Microsoft Software Restriction Policy or a similar functionality from another vendor.

The present invention may also be viewed as a method for verifying gaming terminal software, comprising the steps of installing at least one driver into the gaming machine; taking complete control of the gaming machine with the at least one driver; verifying a legitimacy of all software and memory content in the gaming machine; relinquishing control of the gaming machine, and authorizing the gaming machine to execute only of the software that may be successfully verified. The verification step may include a challenge-response step to ensure that the trusted verifier driver has not been spoofed and/or that the trusted verifier driver is executing.

The driver(s) may be configured to execute at the highest machine permission level. The taking step may include a step of freezing an operation of the operating system of the gaming machine. The taking step may also include a step of disabling interrupts on the gaming machine. The verifying step may include verifying a BIOS of a motherboard of the gaming machine. The verifying step may include verifying a BIOS of any add-on board within the gaming machine. The verifying step may include verifying ROM shadowing within the gaming machine, verifying hardware registers, verifying a signature in memory of the at least one driver, verify the content of files on disk within the gaming machine and/or verifying the downloadable micro-code of smart hardware within the gaming machine, for example. The method may further include a step of auditing the source code of the driver(s) by a third party. The source code of the driver(s) may also be audited by a game certification lab. The method may further include a step of certifying the driver(s) by a game certification lab and/or by a third party. The gaming machine may be controlled by a PC, the driver(s) may be code signed and the installing step may be triggered by one or more plug-and-play dongles inserted in one or more ports of the PC. The driver(s) installed in the installing step may be code-signed by Microsoft's WHQL—or another certifying agency, for example. The verifying step may verify the legitimacy of the software and memory contents without modifying the content thereof and the method further may include a step of reporting an outcome of the verifying step. The gaming machine further may include a third party dongle installed therein and the driver(s) may be linked to the third party dongle to enable the third party to audit the driver(s). The gaming machine further may include a hard disk drive that may include a partition formatted for simple file access (by means of a FAT, for example) and wherein the method further may include a step of accessing code-signed downloaded software from the simple file access partitioned hard disk drive. The hard disk drive partition may be formatted according to FAT2 protocol, for example. The verifying step may verify the memory content stored on one or more of the following within the gaming machine: a hard disk drive of the gaming machine, an optical memory of the gaming machine, flash memory of the gaming machine, non-volatile RAM memory of the gaming machine, ferromagnetic memory of the gaming machine, magnetic memory of the gaining machine, and/or holographic memory of the gaming machine, for example.

The present invention, according to another embodiment thereof may be seen as a gaming machine, comprising: at least one processor; at least one data storage device; a plurality of processes spawned by the at least one processor, the processes including processing logic for carrying out steps of: running an operating system loaded in the gaming machine; downloading at least one software module into the gaming machine; checking a code signature of at least one downloaded software module using a trusted verification driver, and authorizing execution of the downloaded software module in the gaming machine only if the downloaded software module may be successfully verified by the trusted verification driver.

The present invention is also a gaming machine, comprising: at least one processor; at least one data storage device; a plurality of processes spawned by the at least one processor, the processes including processing logic for carrying out steps of: installing at least one driver into the gaming machine; taking complete control of the gaming machine with the at least one driver; verifying a legitimacy of all software and memory content in the gaming machine; relinquishing control of the gaming machine, and authorizing the gaming machine to execute only of the software that may be successfully verified.

DETAILED DESCRIPTION OF THE INVENTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
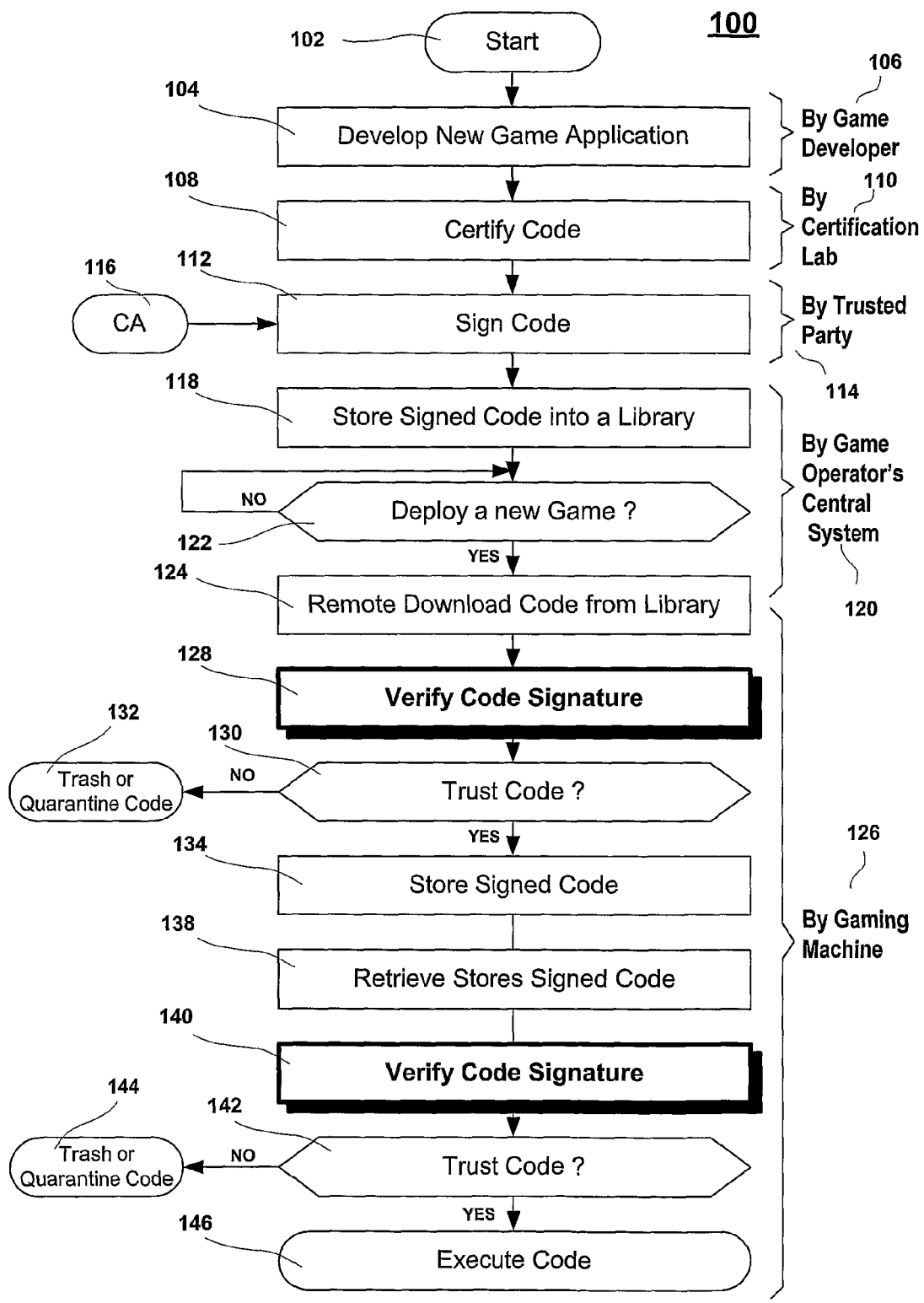
FIG. 1 illustrates a new game deployment cycle.

A new game deployment campaign whereby one or a plurality of gaming machines are to receive a new game is represented in FIG. 1. The flowchart 100 starts at 102 when the decision to initiate a project to develop and release a new game is made. The game developer 106 develops a new game application 104 whose code must be certified at 108 by a recognized certification lab 110. The certified code must then be signed 112 by a trusted party 114 that is registered with a certificate issuing authority (CA) 116. The trusted party 114 may be the certification lab 110. The signed code is stored in a library 118 on a server on a game operator's central system 120.

When the decision to deploy the new game 122 is taken by the game operator, the game terminal(s) enter into a remote download session of the code stored in the library 124 located in the game operator's central system 120. Prior to downloading, the code stored in the library may be verified for proper code signing to ensure the code has not been replaced in the library. Upon receiving the downloaded code, the gaming machine or terminal 126 executes a program to verify the code signature of the downloaded code, as shown at 128. If the downloaded code cannot be trusted, the code is trashed or quarantined as shown at 130, 132. If the downloaded code can be trusted (successfully passes the verification), it is stored locally in persistent memory in the gaming machine, as shown at 130, 134. Persistent memory may include, for example, a hard disk, an optical disk, a flash memory, One-Time-Programming (OTP) memory, a magnetic memory, a holographic memory and a battery backed-up RAM.

When the new game is requested to execute the downloaded code, the stored signed code is retrieved at 138 and its code signature is verified. If the retrieved downloaded code cannot be trusted, the code is trashed or quarantined as shown at 142, 144. If the retrieved downloaded code can be trusted, it is executed at 142, 146.

As noted by Eric Fleishman in Code Signing, The Internet Protocol Journal, Volume 5, Number 1, March 2002, code signing is a mechanism to sign executable content. The phrase "executable content" refers to presenting executable programs in a manner so that they could be run locally-regardless of whether the executable file originated locally or remotely. Code signing is commonly used to identify authorship of applications distributed via the Internet. Device drivers can be code signed to inform an operating system of the authorship of that driver. For example, the device drivers for Windows 98/ME/2K/XP operating systems should preferentially be certified by Microsoft's device driver certification laboratory. The entity signs the device driver executable in order to certify that the device driver in question has indeed been successfully demonstrated by a Microsoft certification laboratory to correctly run on that operating system. Code signing may be applied to other type of files; for example Microsoft CAB files. Code signing provides only authenticity and integrity for electronic executable files and some other data files—it does not provide user/process privacy, authentication, or authorization.

A signature provides authenticity by assuring users as to where the code came from and who really signed it. If the certificate originated from a trusted third-party Certificate Authority (CA), then the certificate embedded in the digital signature as part of the code-signing process provides the assurance that the CA has certified that the code signer is who he or she claims to be Integrity occurs by using a signed hash function as evidence that the resulting code has not been tampered with since it was signed.

Code signing appends a digital signature to the executable code itself This digital signature provides enough information to authenticate the signer as well as to ensure that the code has not been subsequently modified.

Code signing is an application within a PKI system. A PKI is a distributed infrastructure that supports the distribution and management of public keys and digital certificates. A digital certificate is a signed assertion (via a digital signature) by a trusted third party, known as the Certificate Authority (CA), which correlates a public key to some other piece of information, such as the name of the legitimate holder of the private key associated with that public key. The binding of this information then is used to establish the identity of that individual. All system participants can verify the name-key binding coupling of any presented certificate by merely applying the public key of the CA to verify the CA digital signature. This verification process occurs without involving the CA.

A public key refers to the fact that the cryptographic underpinnings of PKI systems rely upon asymmetric ciphers that use two related but different keys, a public key, which is generally known, and a private key, which should be known only by the legitimate holder of the public key.

The certificates used to sign code can be obtained in two ways: They are either created by the code signers themselves by using one of the code-signing toolkits or obtained from a CA. The signed code itself reveals the certificate origin, clearly indicating which alternative was used. The preference of code-signing systems (and of the users of signed code) is that the certificates come from a CA, and CAs, to earn the fee they charge for issuing certificates, are expected to perform "due diligence" to establish and verify the identity of the individual or institution identified by the certificate. As such, the CA stands behind (validates) the digital certificate, certifying that it was indeed issued only to the individual (or group) identified by the certificate and that the identity of that individual (or group) has been verified as stated. The CA then digitally signs the certificate in order to formally bind this verified identity with a given private and public key pair, which is logically contained within the certificate itself. This key pair will subsequently be used in the code-signing process.

Figure 2:
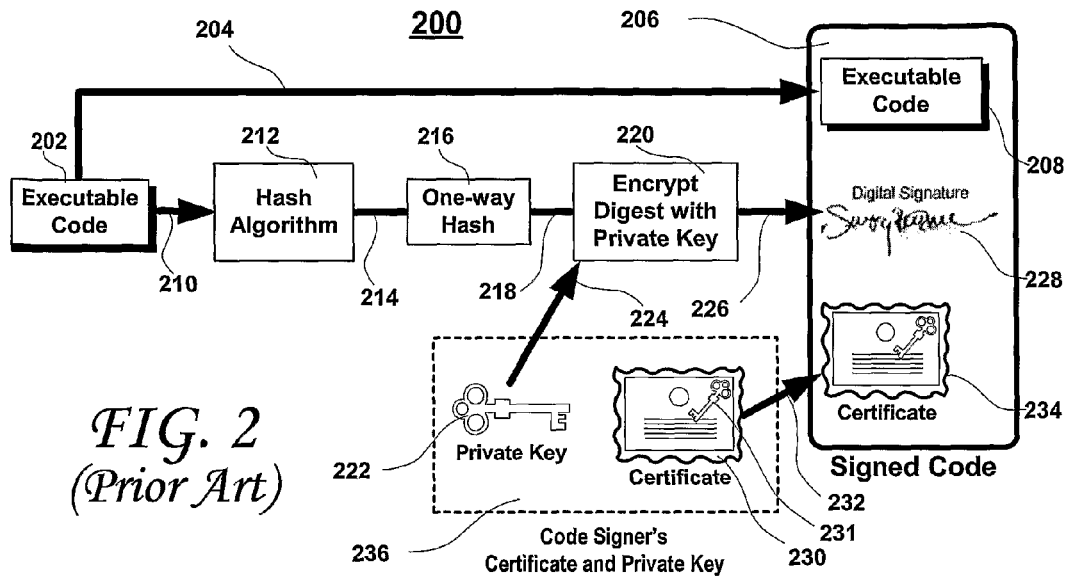
FIG. 2 illustrates a conventional code signing process.

Code signing may be accomplished as shown in FIG. 2. The signing utility uses a hash algorithm 212 on the executable code 202,210 to compute a digest 216 (which is also known as a one-way hash) by securely compressing executable code 202 of arbitrary length into a fixed-length digest result 216. The most common hash function algorithms used in code signing are the Secure Hash Algorithm (SHA), Message Digest Algorithm 4 (MD4), or MD5. The resulting length of the digest is a function of the hash function algorithm, but a common digest length is 128 bits. The digest 216, 218 is then encrypted 220 using the trustee's private key 222, 224. The encrypted digest 226,228 and the trustee's digital certificate 230, 232, 234 are then appended to the executable code 202,204, 208 to form the signed code 206. The certificate 230, 234 contains the trustee's public key 231.

The private key is kept in a secure place by the trustee to prevent code signing of fraudulent code by an unknown party.

Figure 3:
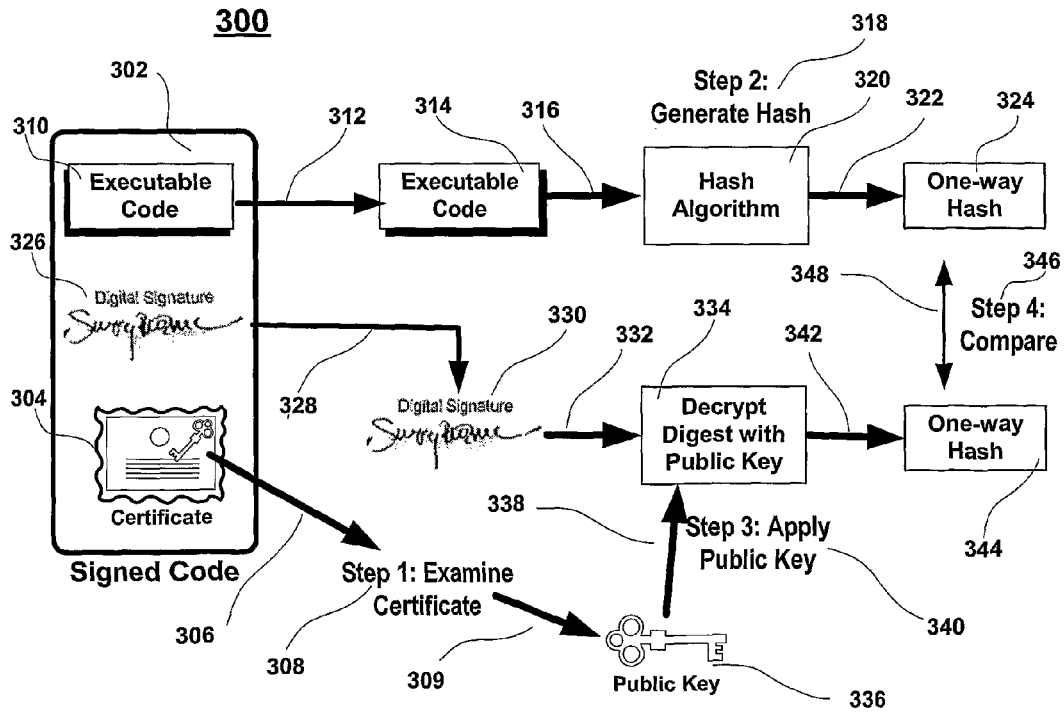
FIG. 3 illustrates a conventional code verification process.

Code-signing verification is accomplished as shown in FIG. 3. Verification of the signed code 302 may be done for example when the gaming machine retrieve the stored game code before executing it 140 as shown in FIG. 1. The verification software inspects the signed code 302 to verify the authenticity and integrity of the received executable code 310. The verification is done in the following manner.

1. Step 1 (308): The certificate 304 is examined 306, 308 to verify that it is recognizable as a correctly formatted certificate, that it originates from a trusted party (the trustee) and that it also contains 309 a correctly formatted public key 336 of the trustee. If not, the process fails.
2. Step 2 (318): If it is, the certificate 304 identifies the hash function algorithm 212 that was used to create the signed digest 216 within the received signed code 206, 302. With this information, the same hash algorithm code 320 that was used to create the original digest 216 is then applied to the received executable code 310, 312, 314, creating a digest value 322, 324, which then is temporarily stored.
3. Step 3 (338): The digital signature 326 (or encrypted digest value) is then taken 328,330 from the signed code 302 and decrypted 332, 334 with the code signer's (the trustee's) public key 336 (public key is contained in certificate 304, 308, 309), revealing the digest value 342, 344, which was originally computed 216 by the trustee signing the code with its private key 222. Failure to successfully decrypt this signed digest value 326 indicates that the code signer's private key was not used to create the received signature. If this is the case, then that signature is a fraud and the code-signing verification process fails.
4. Step 4 (346): The recomputed digest 324 of Step 2 is then compared 348 to the received digest 326 that was decrypted 344 in Step 3. If these two values are not identical, then the code has subsequently been modified in some way and the code-signing verification process fails. If the digests 324 and 344 are identical, then the identity of the code signer (the trustee) is established.

Figure 4:
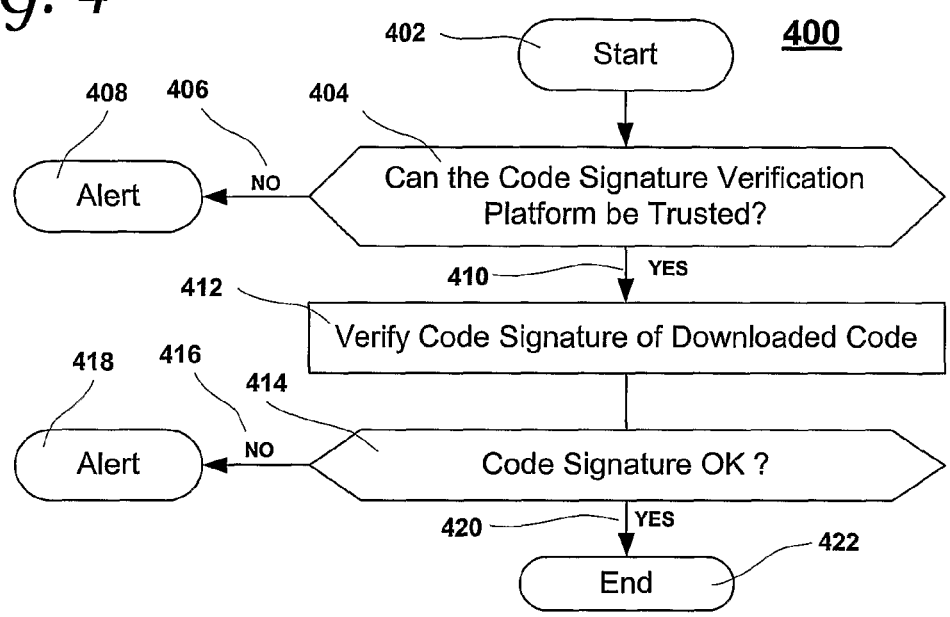
FIG. 4 illustrates an aspect of the present invention, in which the code signature verification platform is itself verified.

There is a dilemma in the code-signing verification process 300, however, in that the process itself might be a fraudulent verification process. Consequently, it is a necessary to be able to verify that the verification platform can be trusted. The code verification processes 128 and 140 may advantageously be replaced by the process according to the present invention, as shown in FIG. 4. The code signing verification 400 starts at 402 by verifying that the code-signing verification platform can be trusted, as shown at 404, 410. If not, then an alert 408 is raised and the overall process fails. If trust can be established as shown at 410, then the code-signing verification can be safely executed, as indicated at 412. If the code-signing verification detects an anomaly as shown at 414, 416, then an alert 418 is raised and the overall process fails. If the code-signing verification succeeds at 420, then the process returns 422 to the main flow 100 as shown in FIG. 1.

Then, again, can we trust that the verification process that verifies that the code signing verification platform can be trusted? Consequently, according to the present invention, all the iterative inner levels of verification processes must be examined until the lowest possible level where trust cannot reasonably be compromised.

Figure 5:
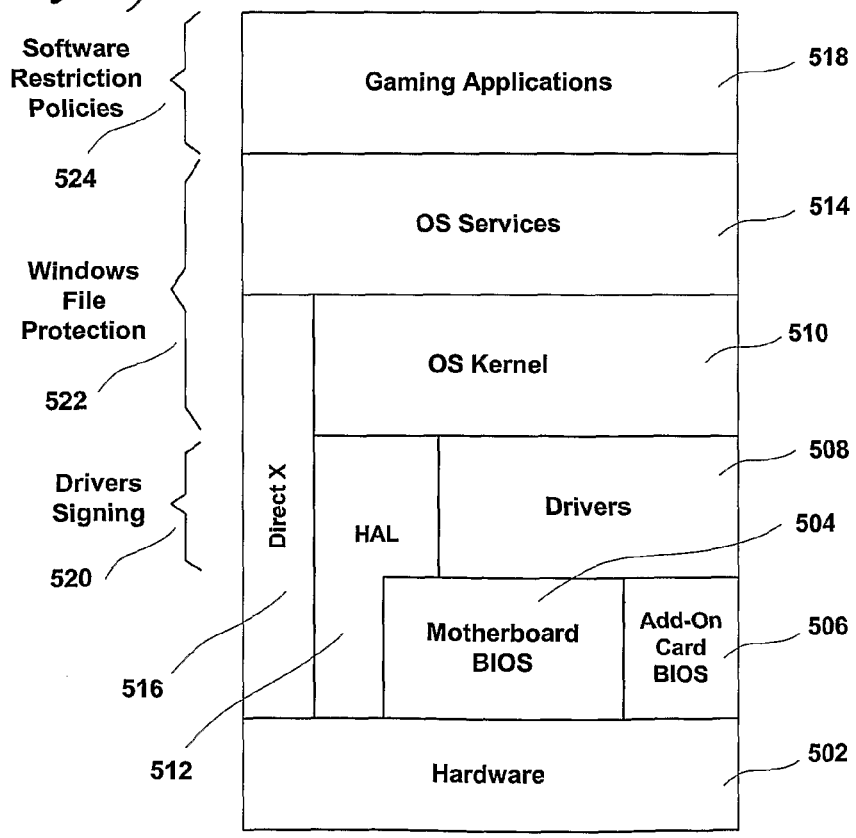
FIG. 5 shows simplified layered view of the Microsoft security model.

A simplified layered view of the Microsoft security model can be examined on the diagram shown at 500 in FIG. 5. The computer hardware 502 is controlled directly via the motherboard BIOS 504, the add-on card BIOS 506, the Hardware Abstraction Layer (HAL) 512 and the DirectX 516 services. The motherboard BIOS 504 has interfaces with the drivers 508 and the HAL 512. The operating system kernel 510 has interfaces with the drivers 508 and the HAL 512 on the lower side, and to the OS services 514 on the upper side. The gaming applications 518 reside on top of the OS services 514.

The Software Restriction Policies technology 524 ensures that only code signed by trusted parties can execute. The code forming the Software Restriction Policies platform is embedded within the operating system and it can be trusted to execute because the Windows File Protection technology 522 ensures that the code is unmodified.

Equivalent technology to Microsoft "Software Restriction Policies" may exist in other existing of forthcoming operating systems. Such technologies are generically referred to herein as "Software Restriction Policies" regardless of the operating system supplier (e.g., Microsoft).

Microsoft's "Software Restriction Policies" support the following four ways to identify software: (1) Hash—A cryptographic fingerprint of the file. (2) Certificate—A software publisher certificate used to digitally sign a file. (3) Path— The local or universal naming convention (UNC) path of where the file is stored. (4) Zone—Internet Zone As stated by John Lambert of Microsoft Corporation in "Using Software Restriction Policies in Windows XP and Windows .NET Server to Protect Against Unauthorized Software", January 2002, A hash rule is a cryptographic fingerprint that uniquely identifies a file regardless of where it is accessed or what it is named.

A certificate rule specifies a code-signing associated with a certificate for software developed or certified by trusted parties. Certificates used in a certificate rule can be issued from a commercial certificate authority (CA) such as VeriSign, a Windows 2000/Windows NET Server PKI, or a self-signed certificate. A certificate rule is a strong way to identify software because it uses signed hashes contained in the signature of the signed file to match files regardless of name or location.

A path rule can specify a folder or fully qualified path to a program. When a path rule specifies a folder, it matches any program contained in that folder and any programs contained in subfolders. Both local and UNC paths are supported.

Zone Rule. A rule can identify software from the Internet Explorer zone from which it is downloaded. These zones are: Internet, Intranet, Restricted Sites, Trusted Sites, My Computer. Currently this applies to only Windows Installer (*.MSI) packages. It does not apply to software downloaded in Internet Explorer.

Windows File Protection technology (WFP) protects system files by running in the background and detecting attempts to replace protected system files. WFP is triggered after it receives a directory change notification on a file in a protected directory. Once this notification is received, WFP determines which file was changed. If the file is protected, WFP looks up the file signature in a catalog file to determine if the new file is the correct Microsoft version. If it is not, the operating system replaces the file with the correct version from the dllcache directory or the distribution media.

Equivalent technology to Microsoft "Windows File Protection" technology may exist in other existing of forthcoming operating systems. Such technologies are generically referred to herein as "Systems File Protection" regardless of the operating system supplier (e.g., Microsoft).

WFP serves the goal of maintaining a stable, reliable and secure operating system by preventing replacement of certain monitored system files except by trusted sources, such as service pack installations or Windows Update.

After detecting the replacement of a protected file, WFP searches for the replaced files in the following order: (1) Search the dllcache directory. (2) If the system was installed via network install, search the network install path. (3) Search on the CD. In the context of the gaming machine, only (1) and (2) would be applicable.

WFP uses Driver Signing to verify files. The code forming the Windows File Protection (WFP) or System Protection File (SFP) platform is embedded within the operating system inner layers and it can be trusted because the Driver Signing technology 520 guards against unknown drivers that may introduce fraudulent code.

As stated in "Digital Signature Benefits for Windows Users", Copyright .COPYRGT. 2001 Microsoft Corporation, Driver Signing serves the goal of maintaining a stable reliable and secure operating system. A driver's digital signature allows the system to ensure that the driver files being installed have not been modified since the files passed testing by Microsoft Windows Hardware Quality Lab (WHQL). Depending on the Driver Signing policy in effect on a user's system, the user might be allowed to disregard warnings and install an unsigned driver.

Equivalent technology to Microsoft "Driver Signing" technology and WHQL scheme may exist in other existing of forthcoming operating systems. Such technologies are generically referred to herein as "Driver Signing" regardless of the operating system supplier (e.g., Microsoft).

It is however easy to recognize that a gap exists between the above-described Driver Signing technology and deeper levels, which may allow fraudulent code to run. For example, fraudulent code may be introduced in the motherboard BIOS or the add-on board BIOS. In a same manner, fraudulent code may be introduced in micro-coded hardware wherein microcode is changeable. None of the Microsoft technologies described above would protect against such intrusions.

Microsoft has recently announced (June 2002) a technology code-named "alladium" that addresses the concerns raised in the previous paragraph.

Figure 6:
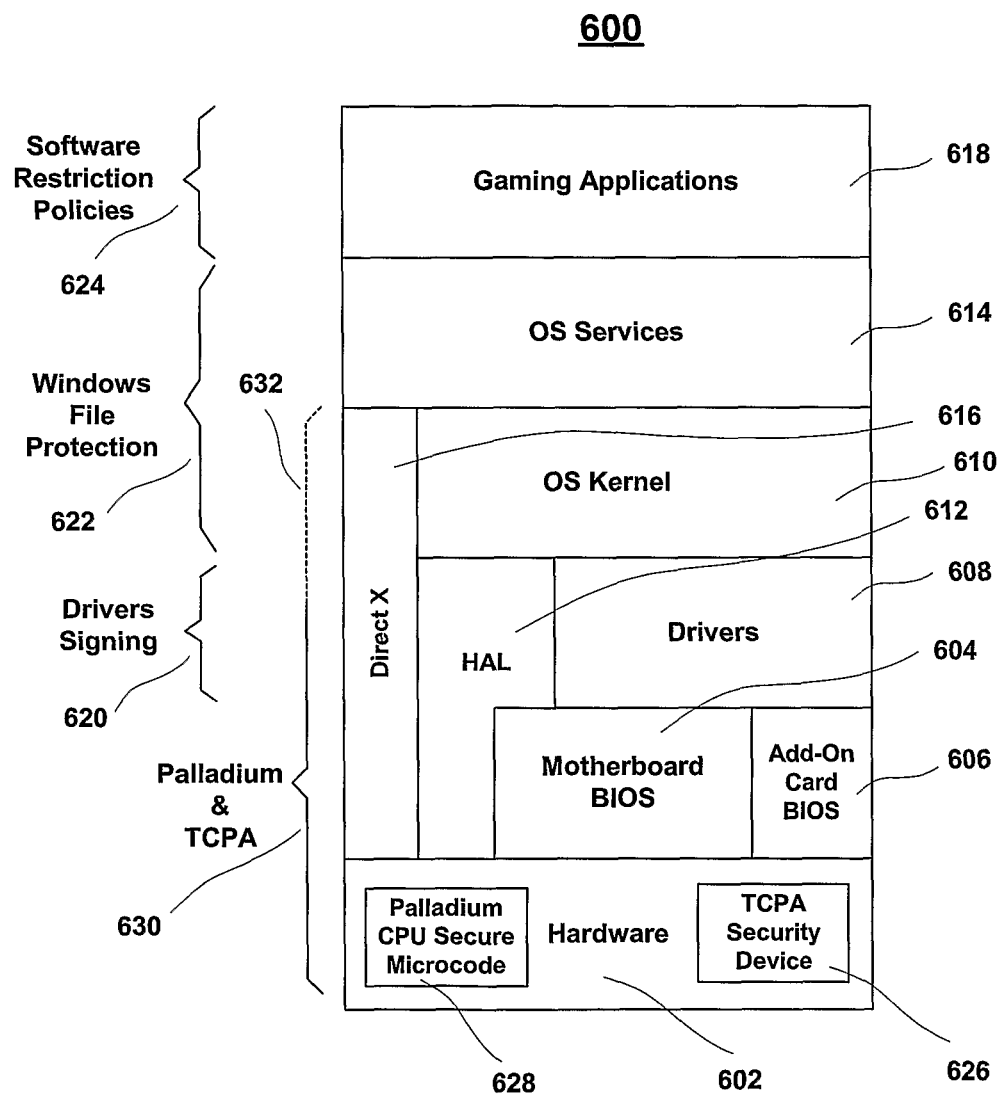
FIG. 6 illustrates proposed Microsoft Palladium technology.

Microsoft Palladium technology may be viewed at 600 in FIG. 6. Palladium requires that a forthcoming specially designed microprocessor (by AMD, Intel, or other CPU manufacturer) and supporting chipsets be mounted in the computer hardware 602 in which special hardwired or downloadable secure micro-code and security devices are incorporated 628. In particular, a tamper-resistant secure cryptographic co-processor is required but it is not clear at this stage if it would be buried inside the microprocessor, inside the chipsets or if it would be a separate component. Secure RAM memory may also be required. It is anticipated that any of these configurations may be supported by Palladium.

Palladium's changes to the CPU Would allow it to be placed into a new mode where certain areas of memory are restricted via a technique called "code curtaining" to an ultra-privileged piece of code called the "nub" or "TOR". ("Nub" is the Palladium team's term for this code, and "TOR", for "Trusted Operating Root", is the official public term.) The nub is a kind of trusted memory manager, which runs with more privilege than an operating system kernel. The nub also manages access to the cryptographic co-processor.

It is not clear at this stage to what level Palladium extends as suggested at 632 and 633, but it is likely that this will at least bridge the gap with the Driver Signing layer 620. The Palladium software code 630 cooperates with the security devices buried within the microprocessor and other secure devices embedded on the computer board to provide a trusted base for everything that executes on higher levels.

The alternative approach is the Trusted Computing Platform Alliance (TCPA), whose specification was finalized in January 2001, calls for the creation of a Trusted Platform Module (TPM) that requires a discrete cryptographic processor 626 residing on the PC's motherboard 602 that contains a unique digital signature. Microsoft Palladium technology 630 is capable of supporting the TCPA specification when a TCPA security device 626 resides on the motherboard.

Although Palladium is marketed as a "Digital Right Management" (DRM) platform, it offers sophisticated advanced security technologies. The capability to support DRM insures that the resulting expected volume of sales would be significant enough to justify Microsoft and microprocessor vendors to work together and invest development budgets. Failure to succeed will enormously benefit vendors who offer specialized devices that guaranty DRM such as Sony DVD players and Game PlayStation. It is therefore clear that the capability to offer DRM in PCs is a matter of survival for companies such as Microsoft, Intel, AMD and National.

Palladium enabled PCs would offer an ideal secure software and hardware platform for gaming terminals. However, this requires specific hardware that may take several years to be proven and to justify using them in gaming machines. Furthermore, there may always remain lingering distrust of large software companies and the standards they promulgate. Equivalent technology to Microsoft code-name "Palladium" technology may exist in other existing of forthcoming operating systems. Such technologies are generically referred to herein "Palladium-like" regardless of the operating system supplier (e.g., Microsoft).

TCPA enabled PCs would also offer a good hardware platform and some TCPA compliant security devices are already available (ATMEL AT90SP0801 and EMBASSY from Wave Systems Corp). However, wide adoption by motherboard manufacturers and availability of proven software support for Windows is not assured.

Equivalent technology to "TCPA" technology may exist in other existing of forthcoming operating systems, security integrated circuits and motherboards. Such technologies are generically referred to herein "TCPA-like" regardless of the operating system supplier (e.g., Microsoft) and the hardware supplier.

Palladium is the Microsoft code-name for a secure technology that requires specific hardware and software applicable for PCs and other computer devices such as mobile phones and hand-held PC. Especially, the microprocessor dice is adapted to incorporate deeply buried security devices and only special super-trusted (ultra-privileged) software mode can access to these buried devices. Although Microsoft and its partners (Intel, AMD, etc. . . . ) will make available to the public the complete Palladium specification and source code, it is not clear whether this technology will be implemented for other operating system platform such Linux, Unix, Wind River, QNX, etc. . . . There may be restriction issues and patent issues that may prevent industry-wide acceptance of Palladium. It is therefore anticipated that competing technology, although not specifically designed for DRM (Digital Right Management), may become available that addresses the same security concern, that is, to operate from a hyper-trusted based that depends on deeply buried security devices not easily accessible without very expensive equipment means. For simplicity of reading, such competing technology is called "Palladium-like" hereafter.

It is, therefore, a further object of this invention to provide a trusted mechanism that does not require a special hardware security device in order to verify the code-signing of the downloaded game software.

Figure 7:
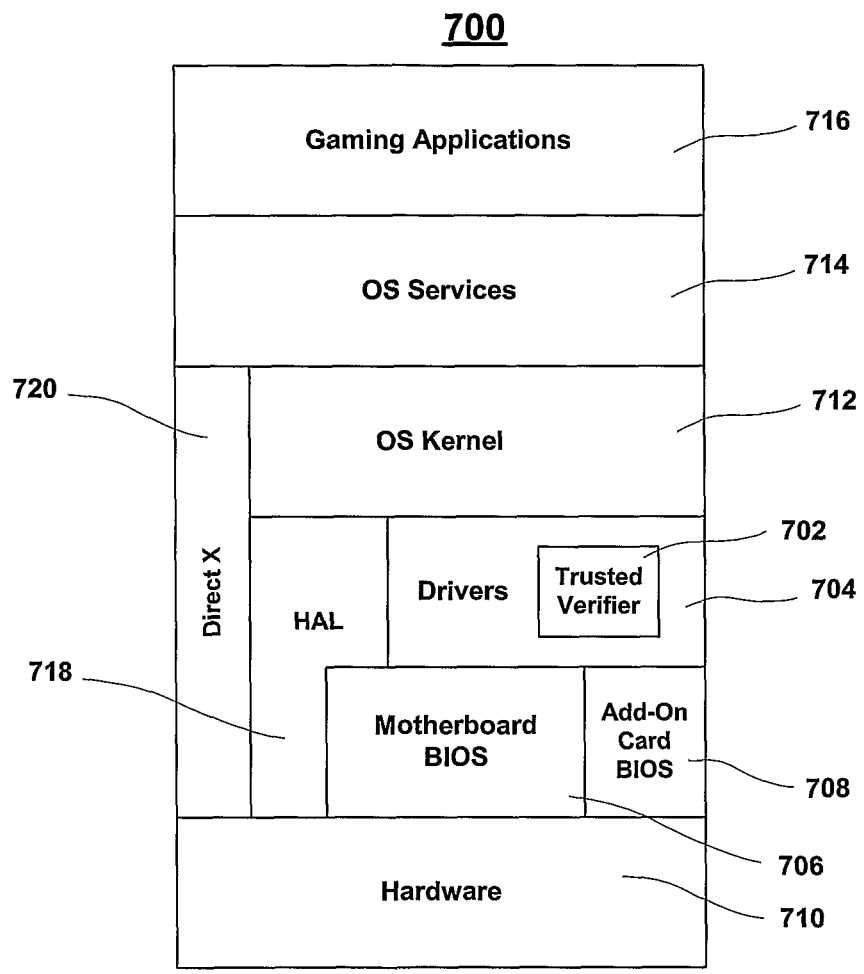
FIG. 7 shows a trusted mechanism for verifying the code signing of downloaded game software in a gaming machine, according to an embodiment of the present invention.

A trusted mechanism for verifying the code signing of downloaded game software in a gaming machine according to an embodiment of the present invention is represented in FIG. 7. The various elements shown in FIG. 7 that bear the same label correspond to the identically labeled elements in FIG. 6 and the description thereof is omitted here for the sake of brevity. FIG. 7 includes, however, a driver named "trusted verifier", referenced at numeral 702. Drivers are a special class of software components that are capable of accessing the totality of the hardware resources 710 of the computer.

When provided by third parties for controlling the add-on hardware that they sell that can be added to the computer, such as a SCSI hard disk controller and a graphics card for example, the third party drivers (a part of 704) are notorious for creating system instabilities and crashes. Furthermore, drivers may introduce fraudulent code that cannot easily be detected or protected against. Fortunately, "script kiddies" that are notorious for releasing countless variants of viruses on the Internet generally do not have the specific knowledge required to develop new "driver viruses". However, a very determined software developer specialized in the coding of drivers may at any time take advantage of this latent opportunity. The same applies to the motherboard BIOS 706 and the add-on board BIOS 708 (one or a plurality of add-on boards and their associated BIOS), especially BIOS stored in Flash memory that can be downloaded from the Internet, or BIOS that is copied from slow access ROM memory to fast RAM (this technique is known as "ROM shadowing"). Nowadays, the BIOS for the motherboard and add-on boards, as well as the firmware for hard disk drives, CD-ROM Writers, and other intelligent peripheral devices can be updated, either manually or automatically, using software code downloaded from the Internet.

Microsoft does not supply and control an entire computer hardware with all its hardware peripherals (which is called a closed platform), as Sun Microsystems and Apple do and has had an extremely tough job of making the operating system run reliably because of these third party provided drivers. To resolve this issue, Microsoft has recently introduced a "Driver Signing" technology to prevent drivers of unknown origin from executing and creating undesirable instabilities. The aforementioned WHQL scheme has been setup whereby third party vendors send their driver executable code to the WHQL that will be extensively subjected to advanced code profiling to ensure that the code obeys a number of specific rules, so as to prevent it to function erratically. Upon successful completion of the test and qualification, the driver executable code is signed with a Microsoft certificate. Consequently, if the operating system policy is configured to accept only Microsoft signed drivers, the operating will prevent the execution of all non-Microsoft signed drivers.

Although Microsoft has set up this scheme for preventing drivers of unknown origin from executing, such Driver Signing does not guarantee that the driver code has no latent fraudulent code in it.

A preferred embodiment of the invention takes advantage of the capabilities of drivers (Microsoft, Linux, Unix or others operating systems) to let the "Trusted Verifier" driver 702 take full control of the computer controlling the gaming machine in order to operate security verifications independently of the operating system and also to ensure that the code-signing verification process can be trusted. The driver source code can be made available for peer review and for certification by a gaming certification lab. The "Trusted Verifier" driver complies with the rules dictated by the operating system and usually a DDK Device Driver Kit is made available by the operating system supplier to help software developers develop their own device drivers. A device driver or simply driver may control a hardware device or no hardware devices. In the later case, the driver is commonly known as a "resident" program or pseudo driver.

In addition, the "Trusted Verifier" driver 702 may be submitted to Microsoft WHQL in order to obtain a driver that is code-signed with a Microsoft certificate. Consequently, the Windows operating system that is controlling the gaming machine computer may be built with the highest security allowed by the three Microsoft technologies "Driver Signing", "Windows File Protection" and "Software Restriction Policies".

Having the "Trusted Verifier" driver 702 signed by Microsoft WHQL ensures that when the highest security policy for drivers is activated, the Trusted Verifier driver may not have been fraudulently changed subsequent to being certified by VHQL. The verification is performed when the driver is loaded for execution by the Windows operating system. Microsoft WHQL may require that a specific hardware device be connected to the PC in order for the "Trusted Verifier" to be installed and be activated. In that case, a simple pluggable hardware device 1406 (FIG. 14) such as a Universal Serial Bus (USB) dongle, a keyboard dongle, a mouse dongle or a printer port dongle compliant with the Plug-And-Play standard may be designed to allow the operating system to install the "Trusted Verifier" driver associated to hardware device.

Figure 8:
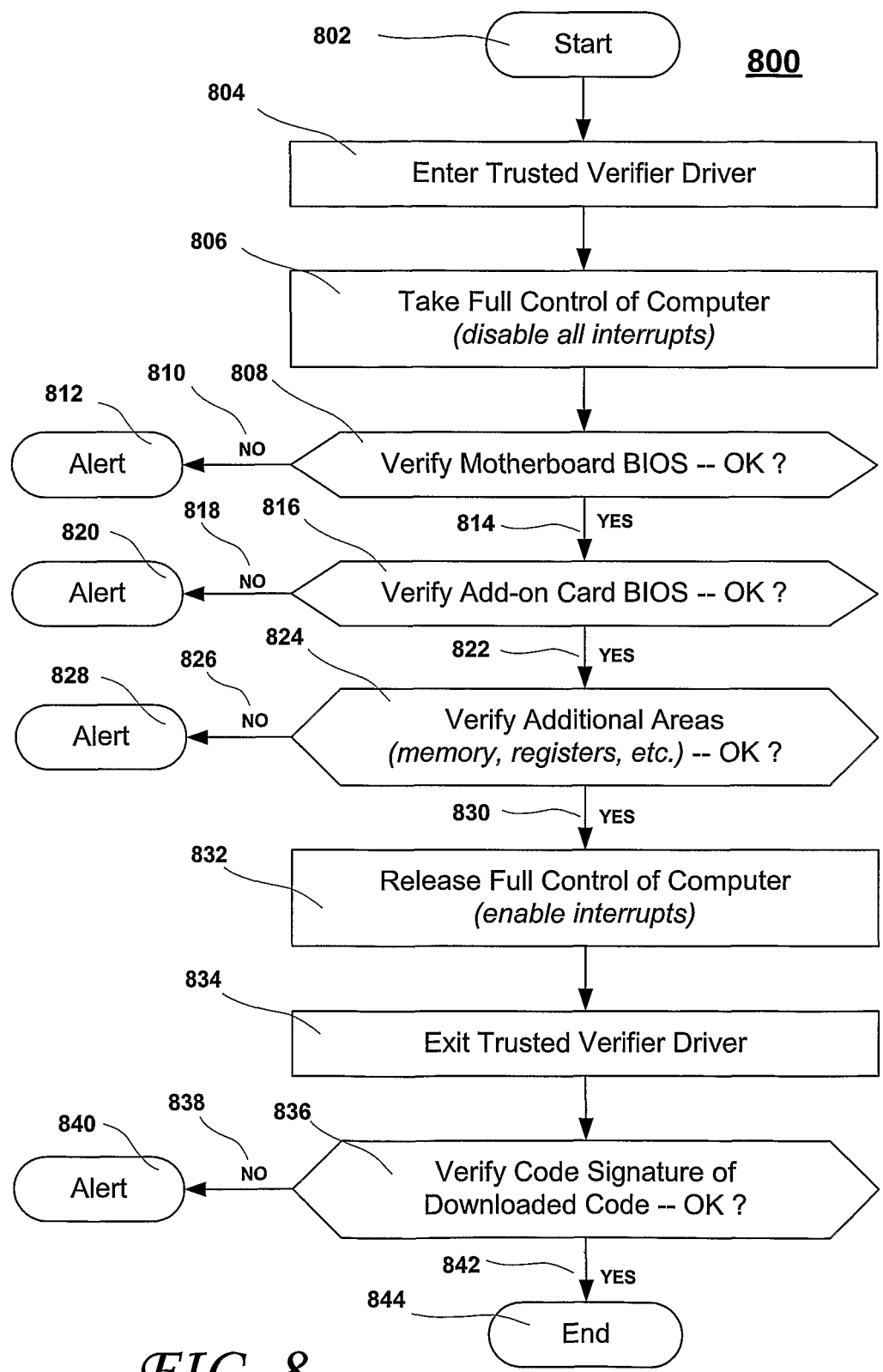
FIG. 8 shows a first method for trusted verification according to an embodiment of the invention.

A preferred embodiment of the invention may use a first method for trusted verification such as depicted in FIG. 8. It is assumed that the "Trusted Driver" has been successfully installed by the operating system as described in the previous paragraphs, either as a signed driver or as an unsigned driver, in the case of a recent version of Microsoft Windows operating system (standard or embedded version) or equivalent operating system featuring the signed drivers technology, or a generic driver in the case of Unix, Linux, QNX and other operating systems.

The Verify Code Signature process 128 and 140 in FIG. 1 may execute as shown in diagram 800. The method starts at 802, whereupon the Trusted Verifier driver execution is entered at 804, which gains full control of the computer 806. To gain full control of the computer, the driver may run at the highest system permission and may first disable all interrupts to prevent preemption by high priority processes. Indeed, keeping all interrupts disabled prevents all other process from operating, which effectively freezes the operating system. Watchdogs may need to be refreshed in order to avoid a hardware restart signal or reset signal to restart the machine. Some functions may no longer be accessible such as the hard disk, which requires the interrupts to operate. However, some minimum access functionality may be achieved by running low level disk access, for example via the hard disk controller BIOS or the hardware controller chipset (the motherboard BIOS, whose source code can be licensed, contains all the necessary low level routines to access and control all the low level functions of the motherboard). Thereafter, the driver may verify the motherboard BIOS at 808, add-on Card BIOS at 816 as well as verify other areas such as RAM memory content, storage memory content and hardware registers as shown at 824, which are each compared with a trusted reference. Of particular importance is the verification of the RAM memory areas taken by the Trusted Verifier driver itself while it is executing, in order to compare its signature with a trusted reference to insure that no virus or other fraudulent code is attached. If any of the verification 808, 816, 824 fails, as shown at 810, 818, 826, an alert is raised, as shown at 812, 820 and 828, respectively. The alert may trigger a predetermined operation such as flashing the red light on the gaming machine tower and preventing further operation of the gaming machine while displaying or logging a relevant error message. If all the verifications are successful as shown at 814, 822, 830 then the driver re-enables the interrupts at 832, and exits the Trusted Verifier Driver at 834.

The exiting 834 of the Trusted Verifier driver indicates that the lower components of the software platform and of the hardware platform are trusted and that consequently, higher level secure technologies such as Driver Signing, System File Verification and Software Restriction Policy are executing on a trusted base. Utilities, associated to Software Restriction Policy and Authenticode such as "Chktrust.exe" may be executed to verify whether the code-signing of the downloaded software (at 836) can be trusted. If not, as shown at 838, an alert 840 may trigger a predetermined operation such as flashing the red light on the gaming machine tower and prevents further operation of the gaming machine while displaying or logging a relevant error message. If the verification is successful at 842, then the process is allowed to end at 844.

Figure 9:
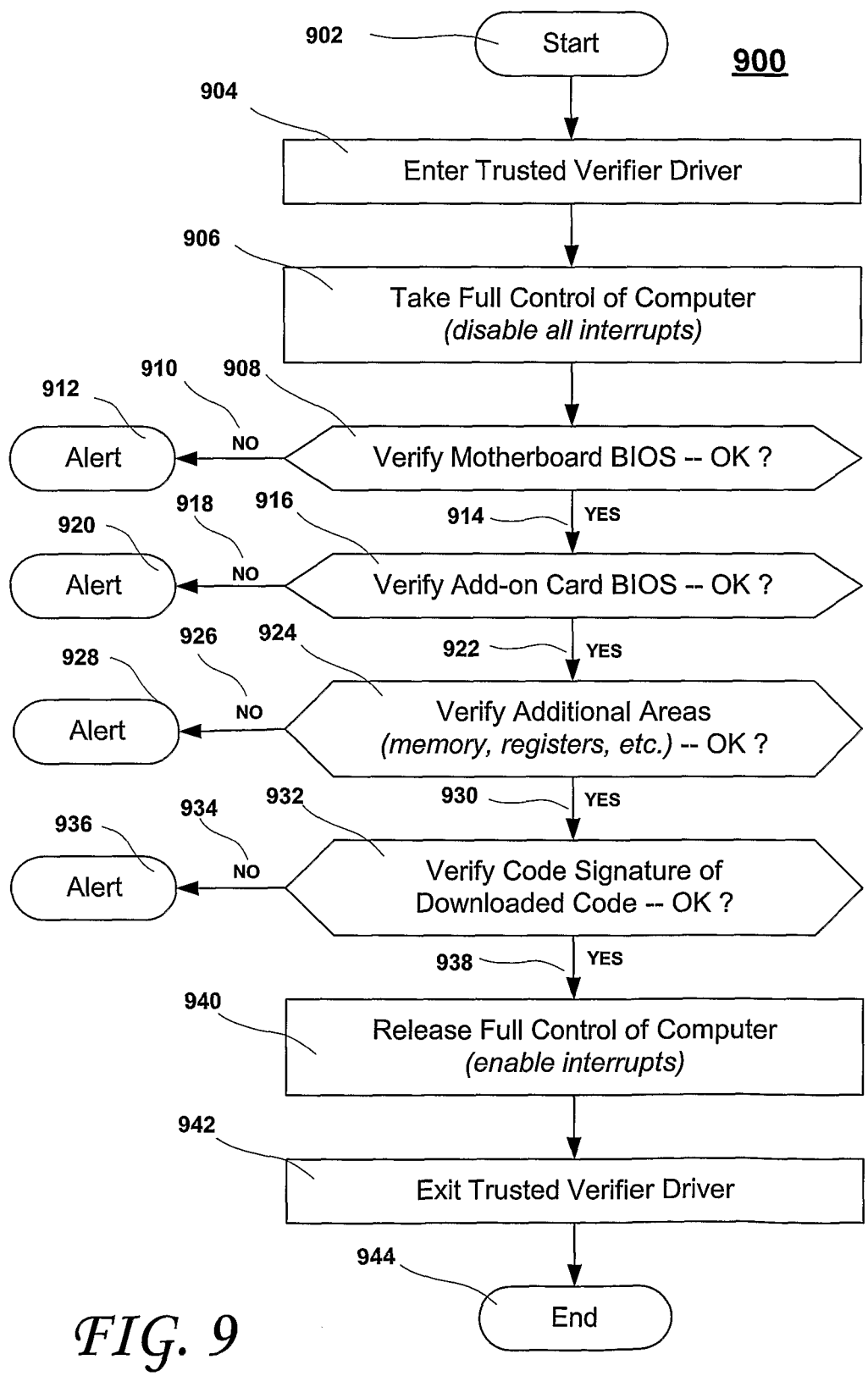
FIG. 9 shows second method for trusted verification, according to another embodiment of the present invention.

A preferred embodiment of the invention may use a second method for trusted verification such as depicted in FIG. 9. It is assumed that the "Trusted Driver" has been successfully installed by the operating system as described in the previous paragraphs, either as a signed driver or as an unsigned driver in the case of a recent version of Microsoft Windows operating system (standard or embedded version) or equivalent operating system featuring the signed drivers technology, or a generic driver in the case of Unix, Linux, QNX and other operating systems.

While performing a game deployment cycle and downloading new game software in the gaming machines as shown in FIG. 1, the "Verify Code Signature" process 128 and 140 is further detailed in diagram 900.

The method starts at 902, whereupon the Trusted Verifier driver execution is entered at 904 and gains full control of the computer at 906. To gain full control of the computer, the driver may run at the highest system permission and may first disable all interrupts to prevent preemption by high priority processes. Keeping all interrupts disabled indeed prevents all other process from operating, and consequently the operating system is frozen. Watchdogs may need to be refreshed in order to avoid a hardware restart signal or reset signal to restart the machine. Some functions may no longer be accessible such as the hard disk that requires the interrupts to operate. However, some minimum access functionality may be achieved by running low level disk access, for example via the hard disk controller BIOS or the hardware controller chipset (the motherboard BIOS, whose source code can be licensed, contains all the necessary low level routines to access and control all the low level functions of the motherboard). Thereafter, the driver may verify the motherboard BIOS at 908, the add-on BIOS at 916 as well as verify other areas such as RAM memory content, storage memory content and hardware registers at 924, which are each compared with a trusted reference. Of particular importance is the verification of the RAM memory areas taken by the Trusted Verifier driver itself while it is executing, in order to compare its signature with a trusted reference to insure that no virus or other fraudulent code is attached. If any of the verifications at 908, 916, 924 fail at 910, 918, 926, an alert is raised at 912, 920, 928, respectively. The alert would trigger a predetermined operation such as flashing the red light on the gaming machine tower and preventing further operation of the gaming machine while displaying or logging a relevant error message.

If all the verifications are successful at 914, 922, 930, this indicates that the lower components of the software platform and of the hardware platform are trusted and that consequently, higher-level secure verification can be trusted. A process may be executed to verify whether the code signing of the downloaded software at 932 can be trusted. If not, as shown at 934, an alert 936 may trigger a predetermined operation such as flashing the red light on the gaming machine tower and prevents further operation of the gaming machine while displaying or logging a relevant error message, for example. If the verification is successful at 938, then the downloaded software can be trusted. The driver may the re-enable the interrupts and release full control of the computer at 940. The Trusted Verifier driver may then be exited at 942 and the method ends at 944.

Process flow 900 differs from process flow 800 in that the verification of the code signature of the downloaded code 932 is performed within the Trusted Verifier driver and not at a higher level by the operating software. This can be seen in the diagram as process 932 is performed before the releasing of the full control of the computer and the re-enabling of the interrupts. In order for the Trusted Verifier driver to be able to verify the code-signing of the downloaded software, the code-signed software downloaded may have to be stored in storage memory that allows such access from the driver. This issue is further discussed relative to FIG. 13.

Figure 10:
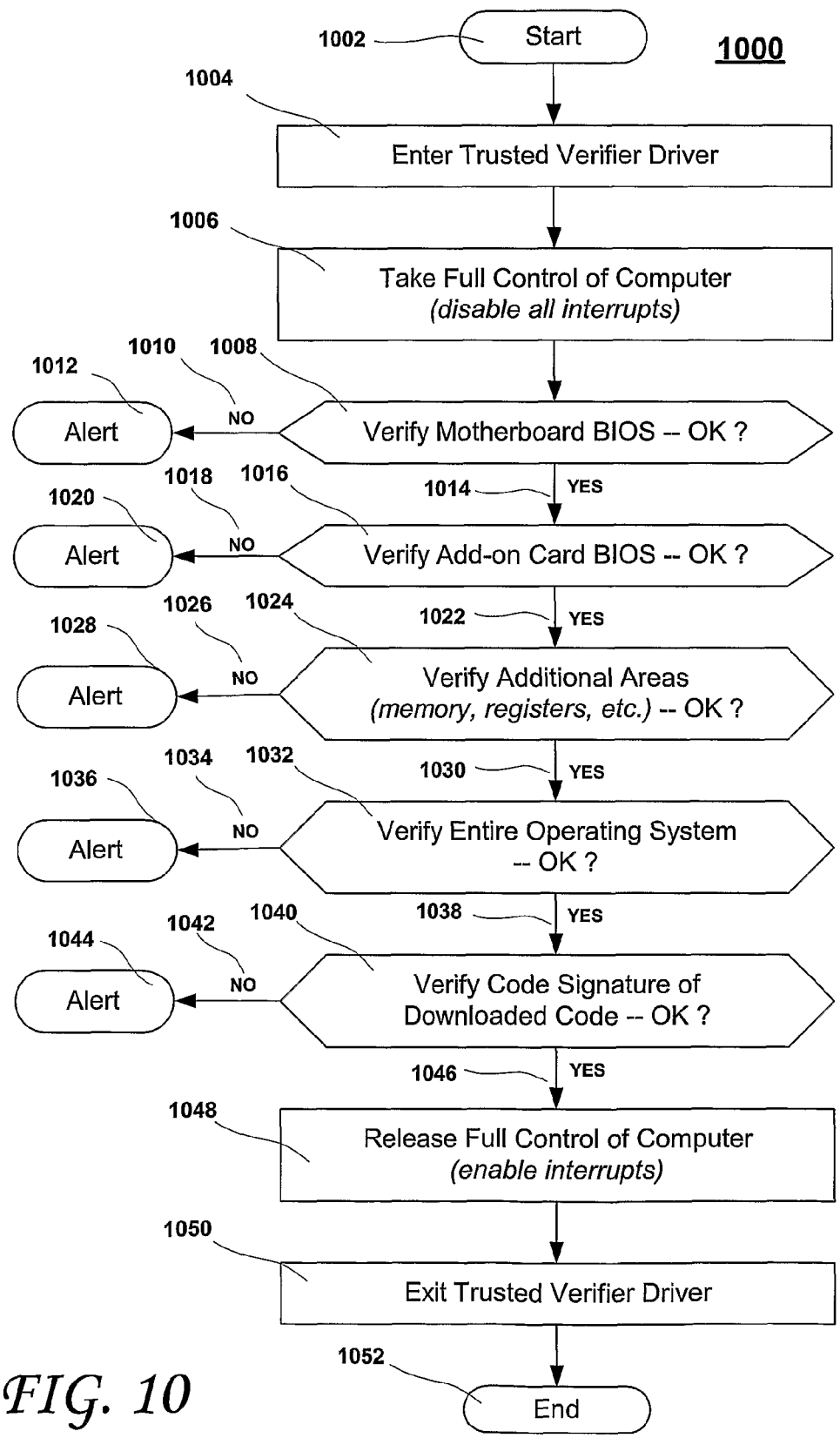
FIG. 10 shows a third method for trusted verification, according to yet another embodiment of the present invention.

A preferred embodiment of the invention may use a third method for trusted verification such as depicted in FIG. 10. It is assumed that the "Trusted Driver" has been successfully installed by the operating system as described in the previous paragraphs, either as a signed driver or as an unsigned driver in the case of a recent version of Microsoft Windows operating system (standard or embedded version) or equivalent operating system featuring the signed drivers technology, or a generic driver in the case of Unix, Linux, QNX and other operating systems.

While performing a game deployment cycle and downloading new game software in the gaming machines as shown in FIG. 1, the "Verify Code Signature" process 128 and 140 is further detailed in diagram 1000. The method begins at 1002 and the Trusted Verifier driver execution is entered at 1004, which gains full control of the computer, as shown at 1006. To gain fall control of the computer, the driver may run at the highest system permission and may first disable all interrupts to prevent preemption by high priority processes. Keeping all interrupts disabled prevents all other process from operating, which effectively freezes the operating system. Watchdogs may need to be refreshed in order to avoid a hardware restart signal or reset signal to restart the machine. Some functions may no longer be accessible such as the hard disk that requires the interrupts to operate. However, some minimum access functionality may be achieved by running low level disk access, for example via the hard disk controller BIOS or the hardware controller chipset (the motherboard BIOS, whose source code can be licensed, contains all the necessary low level routines to access and control all the low level functions of the motherboard). The driver may then verify the motherboard BIOS at 1008, the add-on BIOS at 1016 as well as verify other areas such as RAM memory content, storage memory content and hardware registers 1024, which are each compared with a trusted reference. Of particular importance is the verification of the RAM memory areas taken by the Trusted Verifier driver itself while it is executing, in order to compare its signature with a trusted reference to insure that no virus or other fraudulent code is attached. If any of the verification 1008, 1016, 1024 fails at 1010, 1018, 1026, an alert is raised at 1012, 1020, 1028. The alert may trigger a predetermined operation such as flashing the red light on the gaming machine tower and preventing further operation of the gaming machine while displaying or logging a relevant error message, for example.

If all the verifications are successful at 1014, 1022, 1030, this indicates that the lower components of the software platform and of the hardware platform are trusted and that consequently, higher-level secure verification can be trusted. A process may be executed to verify whether the operating system components 1032 can be trusted. This may be done by accessing the operating system files on the system storage media and by verifying their hash or code-signature with certificate against a trusted reference. Success at 1038 indicates that the operating system can be trusted, as no unauthorized modification has been detected.

A process may be executed to verify whether the code-signing of the downloaded software can be trusted, as shown at 1040. If not, as shown at 1042, an alert 1044 may trigger a predetermined operation such as flashing the red light on the gaming machine tower and prevents further operation of the gaming machine while displaying or logging a relevant error message. If the verification is successful at 1046, then the downloaded software can be trusted.

The driver may the re-enable the interrupts and release full control of the gaming machine's computer at 1048. Thereafter, the Trusted Verifier driver is exited 1050 and the method ends at 1052.

The process flow 1000 differs from process flow 900 in that the Trusted Verification driver performs a verification of the operating system components 1032 against a trusted reference. In order for the Trusted Verifier driver to be able to verify the operating system components, necessary access mechanisms to the files must be available. Software to access files on FAT16 or FAT32 formatted disk partitions is quite common. Software to access files on advanced disk partitions such as Microsoft NTFS is less common. Examples of third party products that are capable of accessing NTFS files independently of Microsoft Windows operating system are Partition Magic from PowerQuest Corp. www.powerquest.com and Partition Commander from V Communications, Inc. (www.v-com.com). Source code for allowing NTFS file access is available on the Internet from various freelance developers. In addition, Microsoft is making available the source of its operating system to selected developers.

Figure 11:
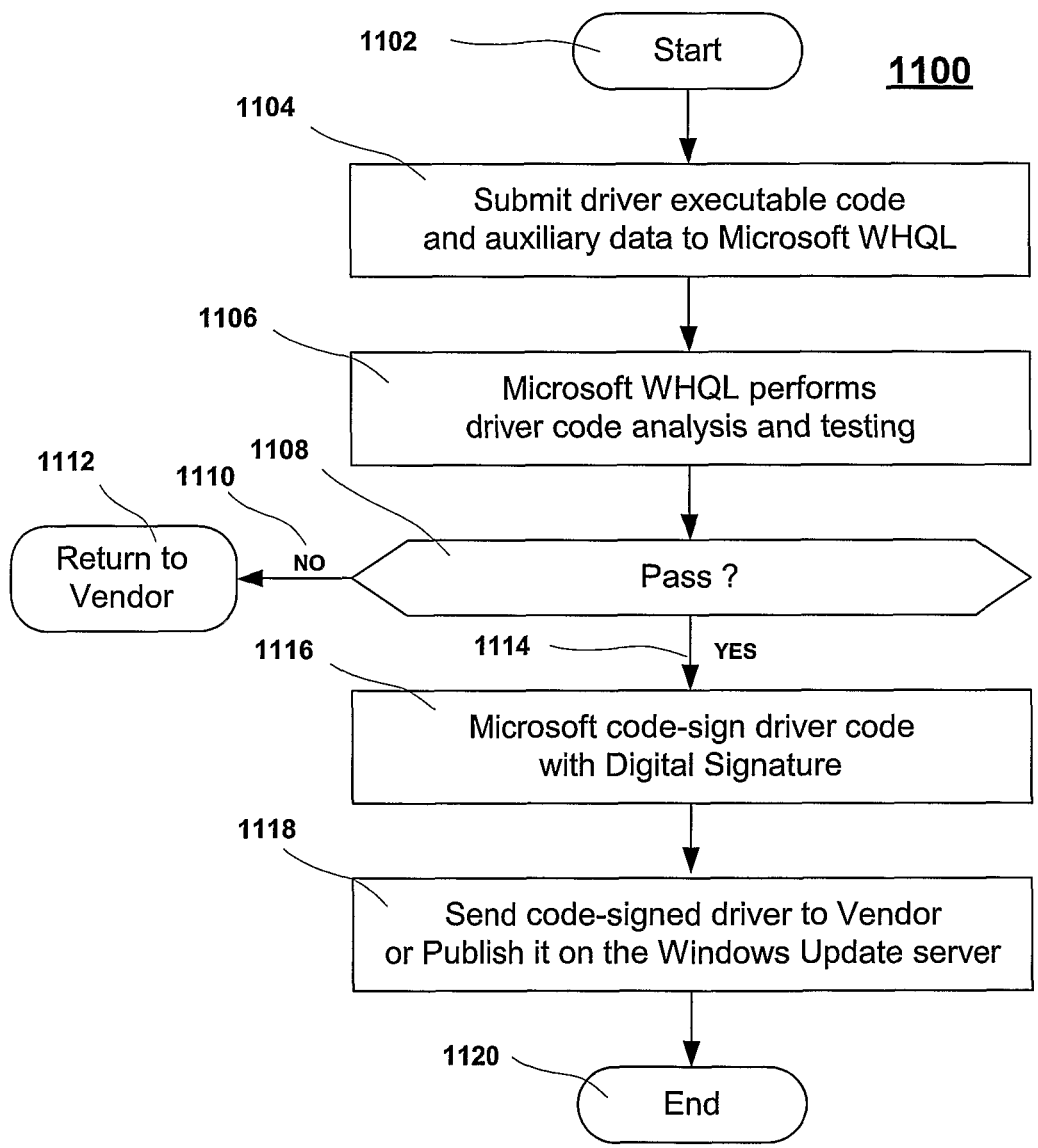
FIG. 11 shows an embodiment of the invention using the Microsoft Windows Hardware Quality Lab (WHQL) scheme.

A preferred embodiment of the invention may use Microsoft Windows Hardware Quality Lab (WHQL) scheme 1000 depicted in FIG. 11. As shown, the method starts at 1102 and the vendor or developer submits the driver executable code and auxiliary data to Microsoft WHQL at 1104. The Microsoft WHQL performs driver code analysis and testing at 1006 to verify the conformity of the driver's code with a set of rules. If the testing 1108 fails at 1110, the software is returned to the vendor at 1112, along with the test reports. If, however, the WHQL testing is successful as shown at 1114 then the driver is code-signed with a Microsoft Digital Signature at 1116. The code-signed driver is sent to the vendor/developer or alternatively is published on the Windows Update server at 1118 for any user connected to Internet to access through the Microsoft Windows Update technology.

Figure 12:
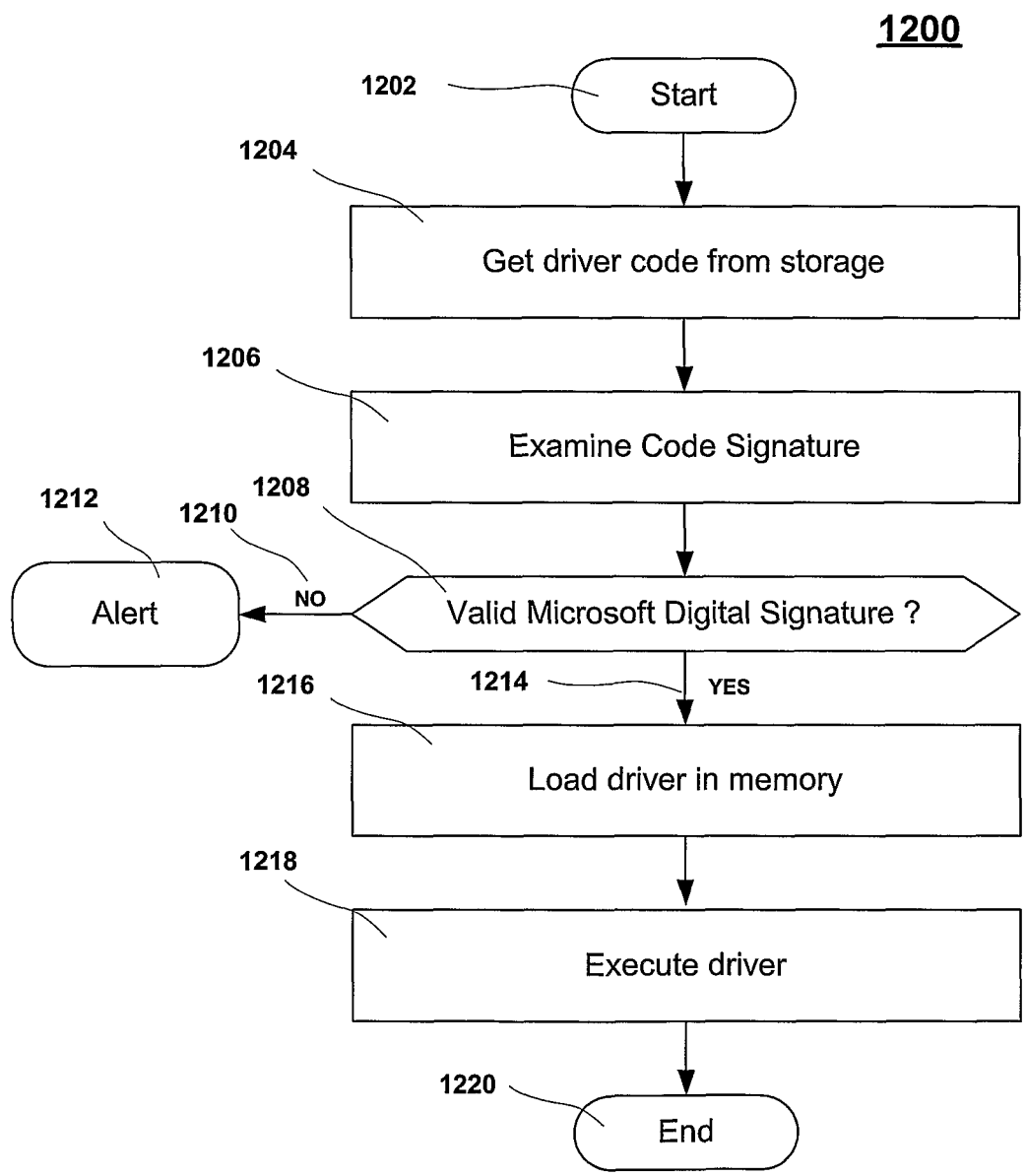
FIG. 12 shows an embodiment of the invention using the Microsoft Driver Signing scheme.

A preferred embodiment of the invention may use Microsoft Driver Signing scheme 1200 depicted in FIG. 12. In the description that follows, the Driver Signing policy 1200 is set up to accept only Microsoft code-signed drivers. The method starts at 1202. When a new hardware device is detected in the gaming machine and identified by its Plug-and-Play identifier by the Windows operating system, the corresponding driver is retried from storage at 1204 and its code-signing is examined at 1206. If, at 1208, it is determined that the code-signing is not valid or that the certificate is not from Microsoft, as shown at 1210, an alert 1212 is activating that may log the failure and abort the driver installation. If, however, the code-signing is determined to be valid and the certificate is from Microsoft at 1214, then the driver maybe loaded in memory at 1216 and the driver may be executed at 1218. Usually, when a driver is first installed, only its initialization strategy segment is executed. The body of the driver is executed subsequently when the hardware device needs to communicate with the application. The method ends at 1220

Figure 13:
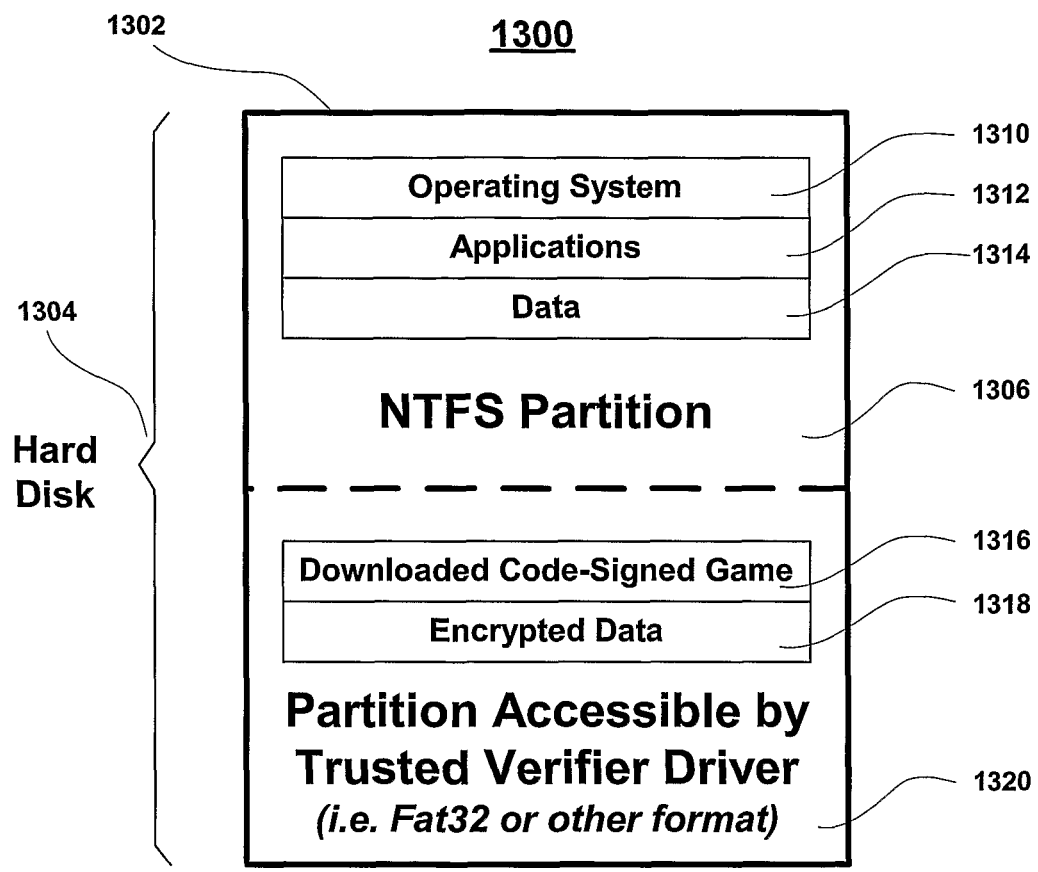
FIG. 13 shows an embodiment of the present invention that uses a disk partitioning scheme.

A preferred embodiment 1300 of the invention may use a disk partitioning scheme 1302 as depicted in FIG. 13. In order to facilitate access to the downloaded code-signed game from the Trusted Verifying driver, the downloaded code-signed game software files may advantageously be stored in a disk partition having a simple file format such as FAT16 or EAT32. The disk 1304 may have two partitions 1306 and 1320. Partition 1306 may be formatted in the NTFS file format, and partition 1320 may be formatted in the FAT32 file format. Partition 1306 may contain the operating system 1310, some applications 1312 and some data files 1314. Partition 1320 may contain the downloaded code-signed game 1316 and some encrypted or signed data 1318.

It is to be noted that strong encryption of the downloaded game files would not present any benefit as there is not requirement to keep secret the content of the file. The objective is to ensure that files have not been fraudulently modified, therefore visibility of or easy access to the game files for reading or even writing is not a significant concern. Ease of access to files for performing code-signing audit from a trusted process such as the Trusted Verifier driver is highly advantageous in order to detect fraud.

When a trusted verification process is available, it is significantly easier to detect fraudulent code prior to its execution than to prevent someone from introducing fraudulent code somewhere amongst the gigantic storage disk space, by numerous means, and at unpredictable times. Once fraudulent code has been detected, forensic analysis may eventually allow tracking down and prosecuting the suspect. Efficient and reliable code-signing verification means may offer strong deterrence.

Figure 14:
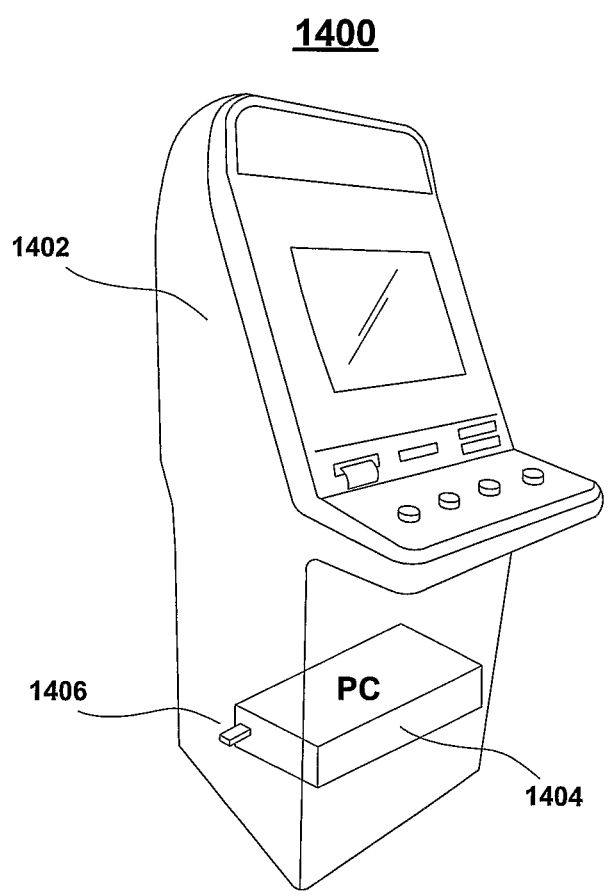
FIG. 14 shows an embodiment of the invention that uses a plug-and-play dongle for the activation of the trusted driver.

A preferred embodiment 1400 of the invention may use a plug-and-play dongle for the activation of the trusted driver as depicted in FIG. 14. FIG. 14 shows a gaming machine or device 1402 that incorporates a PC 1404. Having the "Trusted Verifier" driver 702 signed by Microsoft WHQL ensures that when the highest security policy for drivers is activated, the Trusted Verifier driver may not have been fraudulently changed subsequent to being certified by WHQL. The verification is performed when the driver is loaded for execution by the Windows operating system. Microsoft WHQL may require that a specific hardware device 1406 be connected to the PC 1404 that controls the gaming machine 1402 in order for the "Trusted Verifier" to be installed and be activated. In that case, a simple pluggable hardware device 1406 such as a USB dongle, a keyboard dongle, a mouse dongle or a printer port dongle compliant with the Plug-And-Play standard may be designed to allow the operating system to install the "Trusted Verifier" driver associated to hardware device. The pluggable hardware device may not perform any useful function apart from implementing a compliant Plug and Play interface, and may be constructed using for example a low-cost PICMicro USB family 8-bit microprocessor from Microchip (www.Microchip.com).

Figure 15:
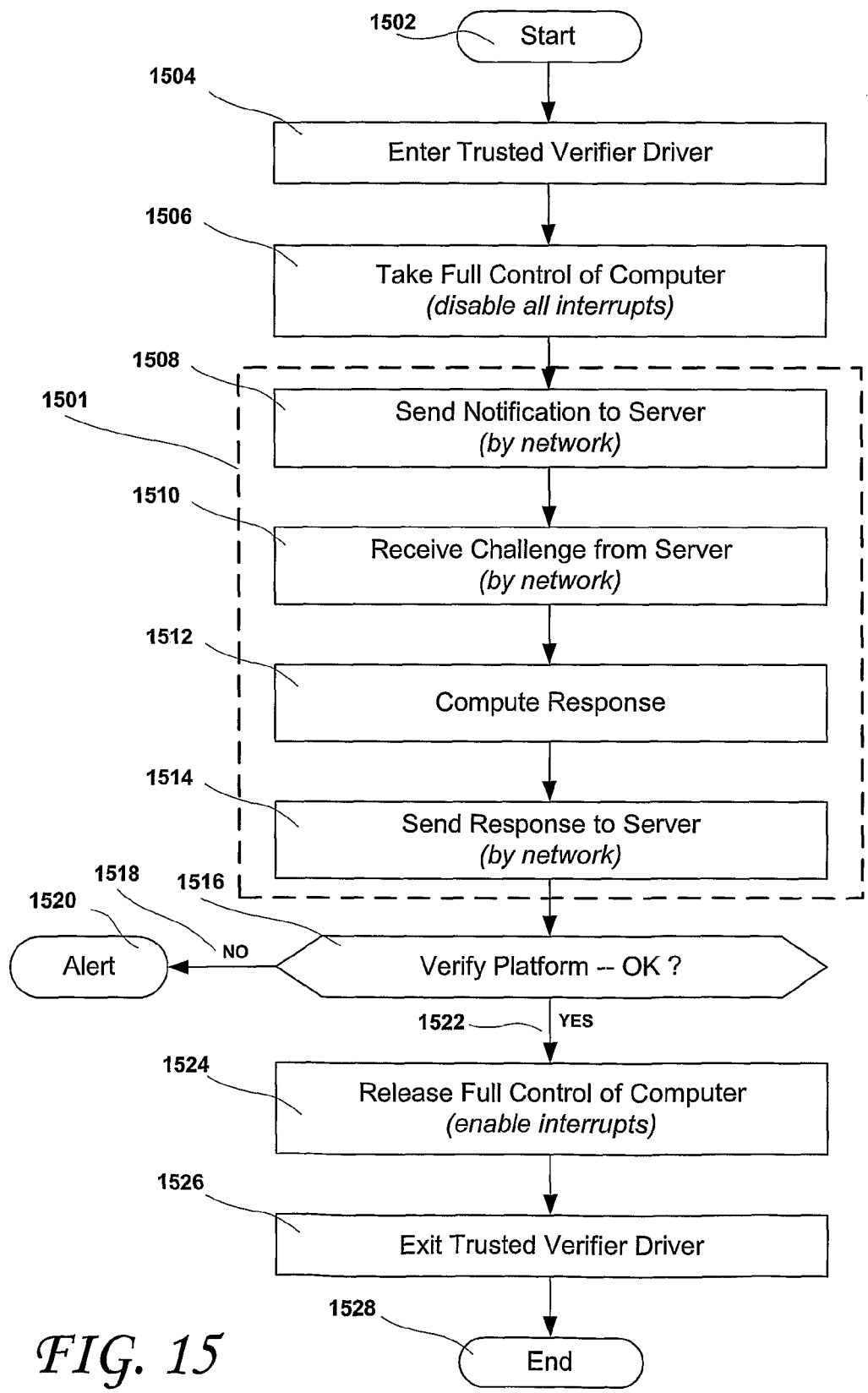
FIG. 15 shows a challenge response sequence according to an embodiment of the present invention.

To ensure that the Trusted Verifier has indeed executed and has not been spoofed (i.e. replaced by a non authorized counterfeit program), a challenge-response controlled by the central system may advantageously be implemented. A challenge-and-response is a common authentication technique whereby some secret information is verified in a response from a given challenge. For any of the Trusted Verifier driver scenarios depicted of FIGS. 8, 9 and 10, an additional challenge-response step 1501 may be added as shown on FIG. 15.

The Trusted Verifier driver execution is entered at 1504, which gains full control of the computer at 1506. To gain full control of the computer, the driver may run at the highest system permission and may first disable all interrupts to prevent preemption by high priority processes. Keeping all interrupts disabled indeed prevents all other process from operating, and consequently the operating system is frozen. Watchdogs may need to be refreshed in order to avoid a hardware restart signal or reset signal to restart the machine. Some functions may no longer be accessible such as network communication that requires the interrupts to operate. However, some minimum access functionality may be achieved by running low level network communication, for example via the Ethernet network controller chipset (source code can be licensed that contains all the necessary low level routines to access and control all the low level functions of the Ethernet network card).

A notification at 1508 may be sent by the driver via the communication network (or a special out-of-bound port) to the central server (or alternatively to an audit device) to inform that the Trusted Verifier driver is executing. The Trusted Verifier waits until it receives a reply from the central server (or alternatively the audit device) at 1510 containing a challenge message produced by the central server (or alternatively the audit device). The Trusted Verifier driver computes a response corresponding to the challenge message according to a predetermined secret algorithm at 1512. A response, shown at 1514 is sent to the central server (or alternatively to the audit device) via the communication network (or a special out-of-bound port). After step 1514, the Trusted Verifier may not engage in further dialog with the central server (or alternatively to the audit device) via the communication network (or a special out-of-bound port).

Then the driver may verify the compute platform at 1516 (motherboard BIOS, add-on BIOS, RAM memory content, storage memory content, hardware registers, etc. . . . ). If the compute platform verification at 1516 fails, as shown at 1518, an alert is raised at step 1520. The alert would trigger a predetermined operation such as flashing the red light on the gaming terminal tower and preventing further operation of the gaming terminal while displaying or logging a relevant error message. If all the verifications are successful at 1522, then the driver re-enables the interrupts at 1524 and exits at 1526.

Independently upon receiving the response from the Trusted Verifier driver at step 1514, the central server (or alternatively the audit device) compares the response received with the expected successful response. If the received response does not match the expected response, the central server raises an alert for immediate action or for forensic analysis. If the response matches the expected response, the event is logged for later analysis to ensure that the Trusted Verifier has executed as expected, by checking for example against the activity log of games played.

Periodically, the activity log of games played is examined against the log of Trusted Verifier responses from the associated gaming terminal. If case of a missing entry or missing entries in the log, spoofing of the Trusted Verifier driver may be suspected.

A special audit device may be used instead of the central system to control the challenge-response authentication. The special audit device may be connected to the standard Ethernet port or to an out-of-bound communication port whereby the data traffic is not mixed with normal network traffic. The out-of-bound port may be an additional Ethernet card, a serial port, a wireless port, a USB port, a wireless communication port, an Infra-Red port or any other port capable of exchanging data.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

For example, those of ordinary skill in the art will appreciate that various combination of the technologies to solve the digital rights management problem or alternatively the hyper-trusted base problem may be derived depending on the exact computing environment. Furthermore, those of ordinary skill in the art will recognize that the invention can be practiced on a large scale although illustrated herein with only a single gaming terminal. For example, the gaming terminal may comprise secure hardware processing means including multi-general-purpose processors (i.e. "Palladium" compliant Intel Pentium CPU) and other secure specialized processors (i.e. graphic co-processor, network co-processor, etc.) spanning within or in the vicinity of the gaming terminal.

The terminology used in this application with respect to is meant to include all hardware and software configuration and all networked environments. For example, processor may mean the microprocessor (i.e. Intel Pentium), the motherboard, the computer, the processing hardware, a PC or a plurality of PCs communicating together. Moreover, the processing hardware is not limited to Intel x86 computer architecture (i.e. may be based on ARM or StrongARM architecture). Therefore, it is manifestly intended that this invention is not to be limited only by the following claims and equivalents thereof.

Conclusions

The invention offers a secure game download platform for updating gaming machines software and games as well as additional security verification at low level independently of the operating system. This way, the reluctance to trust the products of large software manufacturers such as Microsoft may be overcome. This invention may be seen as security tool, whose source code can be audited by peers, in order to verify Microsoft's operating system, for example. As noted above, when a trusted verification process is available, it is significantly easier to detect fraudulent code prior to its execution than prevent someone to introduce fraudulent code somewhere amongst the gigantic storage disk space, by numerous means, and at unpredictable times. Once fraudulent code has been detected, forensic analysis may eventually allow tracking down and prosecuting the suspect. Efficient and reliable code-signing verification means may offer strong deterrence. Consequently, game regulators that are holding back on allowing the early adoption of networked multimedia software technologies may feel more comfortable in adopting such technologies.

The invention claimed is:

1. A method for verifying gaming terminal software, comprising:
   installing at least one driver into a gaming machine;
   blocking execution of an operating system of the gaming machine;
   taking complete control of the gaming machine with the at least one driver executing at a highest machine permission level, disabling interrupts on the gaming machine, and freezing an operation of the operating system;
   verifying a legitimacy of all software and memory content in the gaming machine using the at least one driver, wherein a challenge-response step is used to ensure that the at least one driver has not been spoofed and is executing;

triggering an alert if the verifying operation fails;
relinquishing control of the gaming machine back to the operating system; and
authorizing the gaming machine to execute software that is successfully verified.

2. The method of claim 1, wherein the taking step includes a step of disabling interrupts on the gaming machine.

3. The method of claim 1, wherein the verifying step includes verifying a downloadable microcode of smart hardware within the gaming machine.

4. The method of claim 1, further comprising auditing a source code of the at least one driver by a third party.

5. The method of claim 1, further comprising certifying the at least one driver by a third party.

6. The method of claim 1, wherein the gaming machine further includes a hard disk drive that includes at least one partition formatted for simple file access and wherein the method further includes a step of accessing code-signed downloaded software from the at least one simple file access partitioned hard disk drive.

7. A gaming machine, comprising:
at least one processor;
at least one data storage device; a plurality of processes spawned by the at least one processor, the processes including processing logic for carrying out:
installing at least one driver into the gaming machine;
taking complete control of the gaming machine with the at least one driver executing at a highest machine permission level, disabling interrupts on the gaming machine, and freezing an operation of the operating system;
blocking the operation of an operating system of the gaming machine;
verifying a legitimacy of all software and memory content in the gaming machine, wherein a challenge-response step is used to ensure that the at least one driver has not been spoofed and is executing;
triggering an alert if the verifying operation fails;
relinquishing control of the gaming machine back to the operating system; and
authorizing the gaming machine to execute only of the software that is successfully verified.

8. The gaming machine of claim 7, wherein the taking step includes a step of blocking the operation of the operating system.

9. The gaming machine of claim 7, further comprising the step of auditing a source code of the at least one driver by a third party.

10. The gaming machine of claim 7, wherein the verifying step verifies the legitimacy of the software and memory contents without modifying a content thereof and wherein the plurality of processes include a process to report an outcome of the verifying step.

\* \* \* \* \*